United States Patent [19]

Sakamoto

[11] 4,127,871

[45] Nov. 28, 1978

[54] METHOD OF COLOR CORRECTION INCLUDING TRANSFORMING CO-ORDINATE SYSTEMS OF COLOR SEPARATION SIGNALS

[75] Inventor: Takashi Sakamoto, Kyoto, Japan

[73] Assignee: Dainippon Screen Seizo Kabushiki Kaisha, Kyoto, Japan

[21] Appl. No.: 722,376

[22] Filed: Sep. 13, 1976

[30] Foreign Application Priority Data

Sep. 12, 1975 [JP] Japan .................................. 50-111368

[51] Int. Cl.$^2$ .............................................. G03F 3/08
[52] U.S. Cl. .................................................... 358/80
[58] Field of Search ................................... 358/80, 78

[56] References Cited

U.S. PATENT DOCUMENTS

| | | | |
|---|---|---|---|
| 2,790,844 | 4/1957 | Neugebauer | 358/80 |
| 3,612,753 | 10/1971 | Korman | 358/80 |
| 3,800,071 | 3/1974 | Reeber | 358/80 |
| 3,801,736 | 4/1974 | Kosaka et al. | 358/80 |
| 3,893,166 | 7/1975 | Pugsley | 358/80 |
| 3,904,816 | 9/1975 | Taudt et al. | 358/80 |
| 4,017,894 | 4/1977 | Akami et al. | 358/80 |
| 4,020,502 | 4/1977 | Hayami et al. | 358/80 |

Primary Examiner—Robert L. Griffin
Assistant Examiner—Aristotelis M. Psitos
Attorney, Agent, or Firm—Holman & Stern

[57] ABSTRACT

A method of color correction of the particular application to a color scanner or a color facsimile for producing color separation images by photoelectrically scanning a color original. Usually, color separation signals obtained from the scanning operation are used as addressing signals for reading out correction signals or already-corrected recording signals memorized in a memory. In this case, according to this method, there is provided before the memory a premasking circuit which is capable of converting the functions of the color separation signals so as to convert co-ordinate systems of the color separation signals and the memorized signals. The conversion of the co-ordinate systems facilitates a considerable reduction of the memory's capacity and, at the same time, achieves more efficient use of the memory.

1 Claim, 21 Drawing Figures

FIG. 1
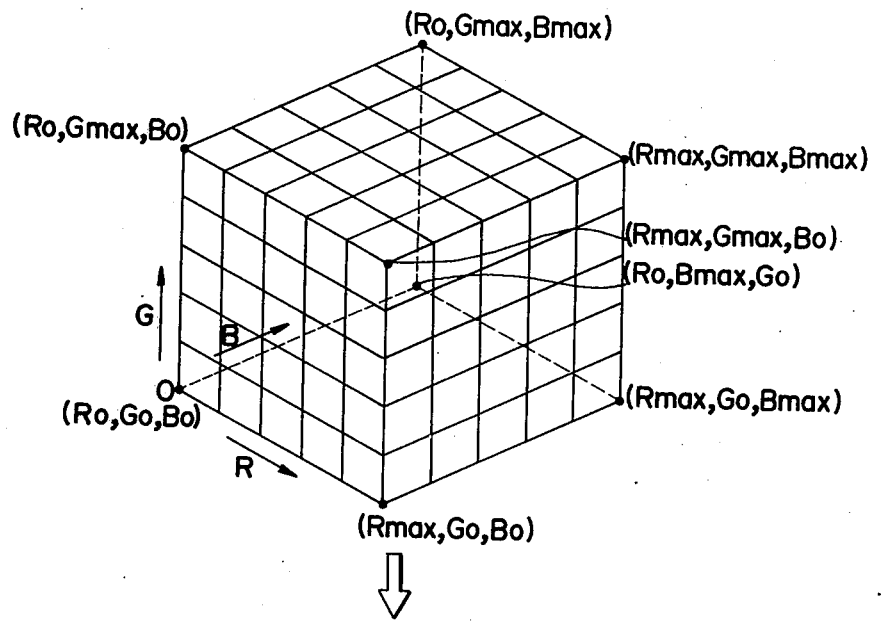
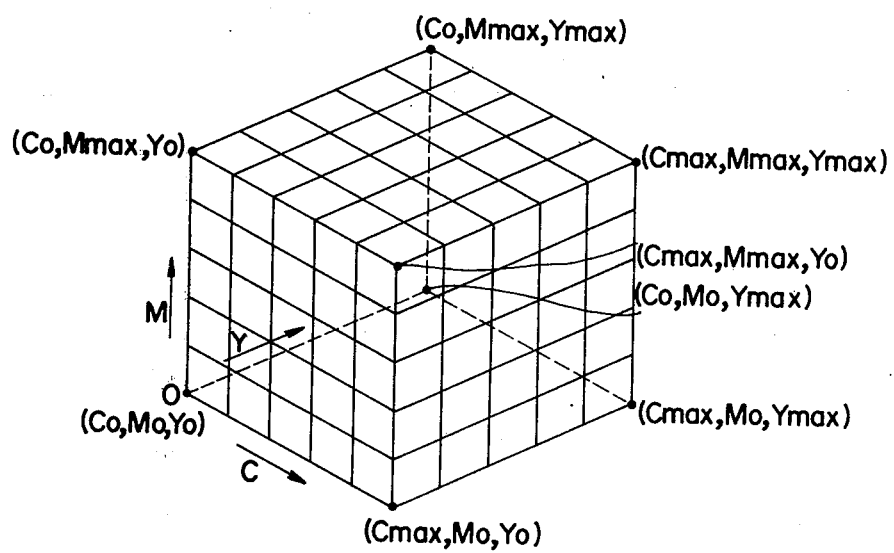

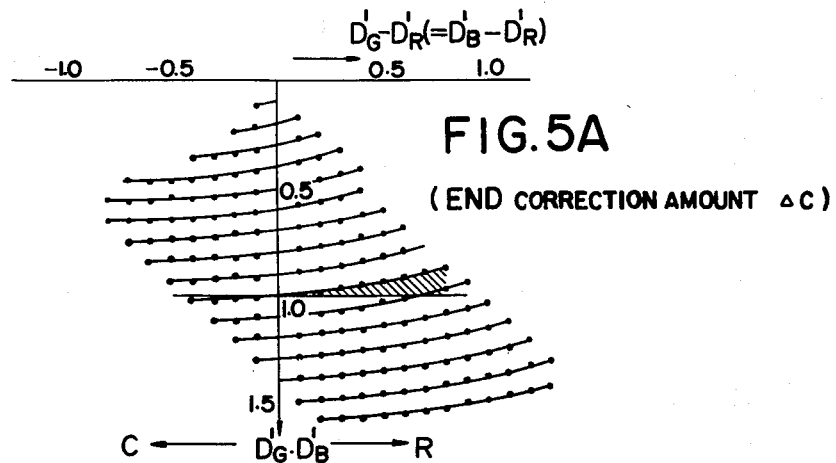
FIG.5A (END CORRECTION AMOUNT ΔC)
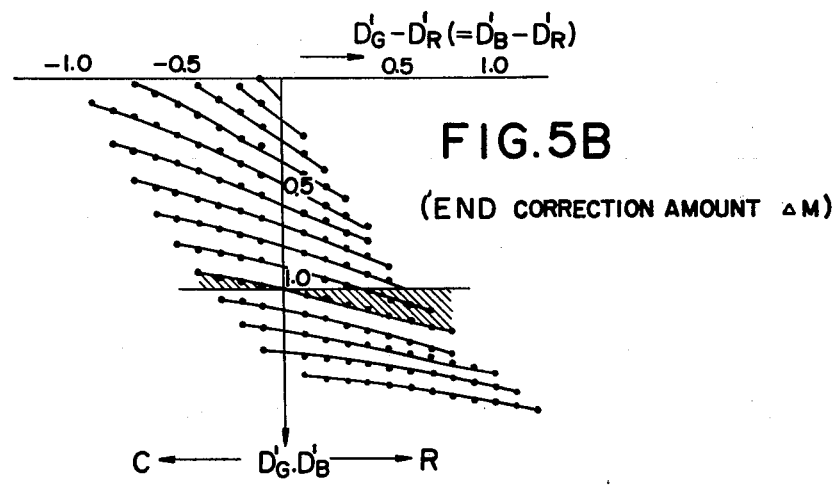
FIG.5B (END CORRECTION AMOUNT ΔM)
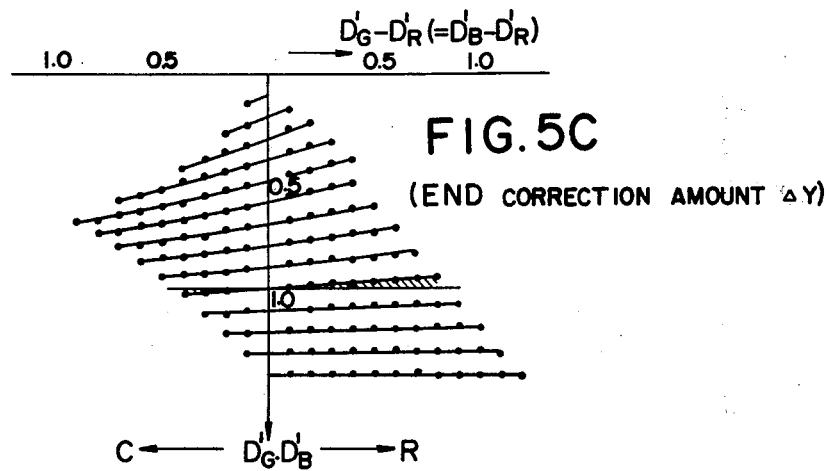
FIG.5C (END CORRECTION AMOUNT ΔY)

(END CORRECTION AMOUNT ΔC)

(END CORRECTION AMOUNT ΔM)

(END CORRECTION AMOUNT ΔY)

(END CORRECTION AMOUNT ΔC)

(END CORRECTION AMOUNT ΔM)

(END CORRECTION AMOUNT ΔY)

METHOD OF COLOR CORRECTION INCLUDING TRANSFORMING CO-ORDINATE SYSTEMS OF COLOR SEPARATION SIGNALS

BACKGROUND OF THE INVENTION

The present invention relates to a method of color correction in a plate-making process, and more particularly relates to a method of correcting color separation signals obtained from the spot-by-spot photoelectrical scanning of a color original.

To improve the accuracy of color reproductions, as is well known, for the past years there have been employed two alternative methods of color correction; handwork and photographic masking. Particularly, the latter method has been playing a significant part in producing multi-color plates. This method of color correction, however, has such disadvantages that, for instance, many skilled persons are required, its color correction ability is very much limited, its color separation result is not always uniform and further its process is very complicated.

Recently, an electronic color separator, generally called a "color scanner", has been put into practice for color separation as well as color correction to eliminate the disadvantages of the photographic masking method, and now it rather stands in a main current in the relevant technical field. Most of color scanners now in wide use employ a computer of the analog rather than the digital type so as to facilitate speedy computations in color correction. This analog computer, however, is also known to have some disadvantages for all its capability of the speedy computations. For example, it lacks an ability of accomodating itself to a wide range of equations, and therefore operational amplifiers or other components would increase in number. Furthermore, the analog computer is less operative and more susceptible to external factors such as temperature and noise than a digital computer, in addition to its high manufacturing cost.

These disadvantages of the analog computer may be eliminated, at least theoretically, by replacing it with a digital computer. However, as mentioned before, a mere digitalization of the analog type circuit of the computer would cause a tremendous slow-down in the computing speed and would therefore be of no practical use.

Meanwhile, in a recent print-plate making industry, a so-called "direct scanner" has been proposed in order to comply with a demand for more beautiful and better quality of prints as well as to simplify and speed up operations. This direct scanner fulfills two functions, besides that of conventional color correction, of enlarging or reducing an image to a desired size and simultaneously producing a halftone negative or positive — this process is called a "halftone photography"—. These processes have conventionally been carried out separately by a print-making camera after producing color separation negatives by a color scanner, and color correction by hand-retouching has been given to thus produced color separation negatives. On the other hand, since no step of color correction by hand-retouching is taken in this direct scanner, the color correction of the direct scanner must be performed as accurately as possible.

A recently-developed color correction method may be said to live up to a demand for more accurate color correction to a larger extent. This new method, so to speak, combines merits of both digital and analog computers; that is, it does not only have such merits of the digital as a high reliability, an ability of accomodating itself to a wide variety of color correction computations and high operativeness but it also has such a merit of the analog as an ability of high-speed disposition.

Primarily, the function of a color scanner is to photoelectrically scan a color original spot by spot to obtain color separation signals of each of three primary colors (red, green and blue, which will be referred to as "R", "G" and "B" hereinafter). These R, G and B color separation signals are then fed into a color correction circuit of the color scanner, where eventually calculated are the amounts of printing inks (cyan, magenta, yellow and black) required to reproduce a hue of a certain scanned spot on the color original. Hereinafter, such cyan, magenta, yellow and black inks will be referred to as "C", "M", "Y" and "K".

The above described new method of color correction achieves its aim by taking advantage of the fact that a combination of R.G.B color separation signals representative of a certain spot on the color original exactly corresponds to a combination of the amounts of C, M and Y inks required for reproducing a hue of the spot as a print (in this case, a blank ink signal K is omitted for the purpose of simplifying the descriptions). In other words, the determination of the value of each color separation signal automatically determines the required amount of each ink. According to this color correction method, already-corrected C.M.Y combinations each of which corresponds to a R.G.B combination are previously stored in a memory so that the R.G.B combination obtained by scanning a color original is utilized as an addressing signal for reading out its corresponding C.M.Y combination from the memory.

However, the disadvantage of this method is that, if human eyes can distinguish the density of each of three colors in 200 steps or so, the C.M.Y combinations to be memorized will reach around $200^3 (=8,000,000)$. In order to read them out at a considerably high speed, a core memory or a semiconductive memory, which is very costly, would have to be installed. Though it is of course feasible to divide each color density to 16 steps (in this case, the total combinations will be $16^3$) so as to reduce its memory capacity, each density step becomes too rough and a density difference between the two steps is too big; which results in a quality deterioration of a finished product. A possible way to compensate for the roughness of the steps, namely to prevent a deterioration of a print, is to supplement or interpolate an intermediate value between the two density steps. Even by this way, however, it will turn out to be impossible to reduce the memory capacity to a sufficient level, since not only the C.M.Y signals but also such interpolating signals of intermediate values have to be memorized, and furthermore each of C.M.Y signals needs to be further divided according to its color tone ranging from 0% to 100%.

Another method of reducing a memory capacity of memory to a further extent makes use of the fact that, when each color separation density signal has been digitalized, it is numerically close to the END (equivalent neutral density) value of the color separation density.

NOTE: The terminology "END" is generally interpreted to imply the visual density which a certain color ink would have if it were converted to a neutral grey, or an achromatic color, by superimposing the just-reqired amounts of the fundamental colors. In evaluating a patch of yellow ink, for example, it can be expressed in terms of how much density is produced when the proper amount of magenta and cyan is added to produce a neutral. This density is defined as the END value of the yellow ink patch.

According to this method, there is provided a memory for storing such END correction signals each of which corresponds to the difference between the digitalized color separation density value and the END value of that density. This memorized END correction signals are read out from the memory by the digitalized color separation density signals which function as addressing signals, and they are added to the latter signals; whereby suitably corrected signals to be used for recording a color separation negative may be obtained.

A chief advantage of the above method is that absolute values of the END correction signals are so small that not so many bits are reqired to represent them and therefore it becomes possible to effect a considerable reduction of the memory capacity. This point is in fact remarkable, particularly when compared with the prior methods which have had to employ a memory of larger capacity in order to accomodate not only a great number of already-corrected C.M.Y combinations but also interpolating signals for making up such C.M.Y signals.

However, as will be explained in detail, it is still hard to say that this method is the best measure even thinkable for the reduction of the memory capacity, now that it employs a cubic co-ordinate system for a memory as other prior methods do. It is generally known that because of ink contamination or the like a color region actually reproducible by the printing inks are substantially narrowed. For this reason, all what are memorized in the memory are not always used for actual color reproduction. In other words, so long as a cubic co-ordinate system is employed for the memory, it can not be avoided to store even redundant or unnecessary contents in the memory. As another disadvantage of this method, it may be pointed out that jumpings of END correction signals form one density step to another are relatively large in amount.

SUMMARY OF THE INVENTION

Therefore, a prime object of the present invention is to provide a method of color correction in which an efficiency of usage of a memory is greatly improved; that is, the need of storing redundant contents never to be used is eliminated or reduced.

Another object of the present invention is to provide a method of color correction wherein a memory's capacity is largely reduced.

A still another object of the present invention is to provide a method of color correction wherein jumping amounts of correction signals in a memory are considerably reduced in boundaries of interpolated sections.

According to the present invention there is provided a method of color correction of the particular application to a color scanner or a color facsimile wherein color separation signals obtained from the spot-by-spot scanning of a color original, after being logarithmically converted to color separation density signals, then compressed to the color region reproducible by the primary printing inks and digitalized to digital color separation density signals, are utilized as addressing signals for reading out correction signals or already-corrected recording signals previously memorized in a memory; whereby suitably color-corrected color separation negatives or positives are produced, said method of color correction being characterized in that co-ordinate systems of said color separaton signals and said correction signals or already-corrected recording signals memorized in said memory are converted to different co-ordinate systems by converting the functions of said color separation signals.

Preferably, the conversion of the functions of the color separation signals are perfomed at a premasking circuit provided before said memory.

Preferably, said correction signals memorized in said memory are END correction signals whose co-ordinate systems have been converted according to the conversion of the functions of said color separation signals; each of said END correction signals corresponding to the difference between a preestimated color separation density value which a finished print is supposed to have and its END value.

BRIEF DESCRIPTION OF THE DRAWINGS

The above objects and other features of the present invention will be made more apparent, when descriptions of one preferred embodiment of the invention are made in detail with reference to the accompanying drawings, in which;

FIGS. 1 and 2 are schematic illustrations showing fundamentals of a color correction method by a color scanner.

DETAILED DESCRIPTION OF A PREFERRED EMBODIMENT

Before going into the detail of the present invention, a brief description of how color correction is basically performed by a digital color scanner had better be made with reference to FIG. 1. The upper graph in FIG. 1 indicates that any color on a color original may be reproduced by suitably overlapping three primary colors (red, green and blue) one upon the other, while the lower graph indicates that any color reproduced by R, G and B is also reproducible by three primary printing inks (cyan, magenta and yellow). In other words, certain co-ordinates expressed in terms of R, G and B always correspond to co-ordinates expressed in terms of C, M and Y. Accordingly, the conversion of a R-G-B co-ordinate system to a C-M-Y co-ordinate system can be called "color correction by a color scanner". A color scanner is usually provided with a memory for memorizing such C.M.Y combinations each of which has a one-to-one relationship with a R.G.B combination, which serves as an addressing signal for reading out its corresponding C.M.Y combination.

Though this method of color correction is more advantageous than the prior methods in many respects, it has not succeeded in eliminating a problem concerning a reduction of the memory's capacity. As has been referred to before, even if each color is divided to 16 steps according to its color density so as to reduce the capacity, each density step is so rough that a compensating intermediate value has to be supplemented or interpolated between the two density steps.

Figure 2:
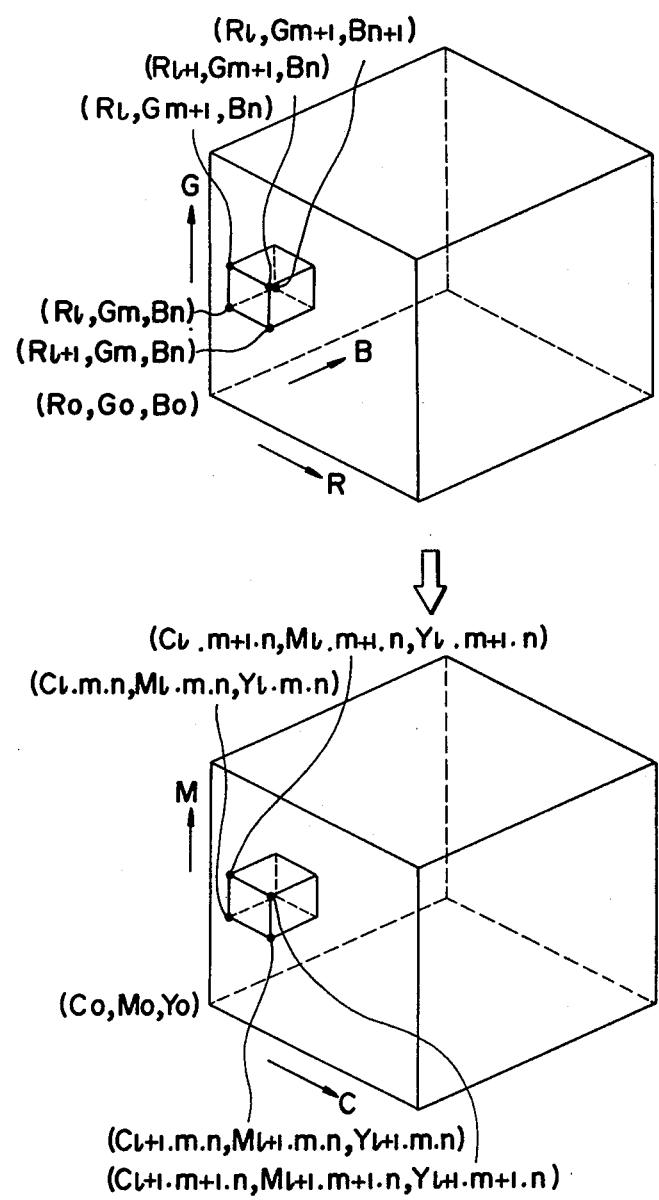

For instance, as shown in FIG. 2 indicating that a certain input value of R, G and B is of the one-to-one relationship with an output value of C, M and Y, if an input value $(R_l, G_m, B_n)$ corresponds to an output value $(C_{l \cdot m \cdot n}, M_{l \cdot m \cdot n}, Y_{l \cdot m \cdot n})$ and another input value $(R_{l+1}, G_{m+1}, B_{n+1})$, which is one step above the input value $(R_l, G_m, B_n)$, also corresponds to an output value $(C_{l+1 \cdot m+1 \cdot n+1}, M_{l+1 \cdot m+1 \cdot n+1}, Y_{l+1 \cdot m+1 \cdot n+1})$, the intermediate output values corresponding to intermediate input values between such two input values can be obtained as follows: when each of the intermediate input values is R, G or B, $R_l \leq R \leq R_{l+1}$, $G_m \leq G \leq G_{m+1}$, $B_n \leq B \leq B_{n+1}$, each of the intermediate output values is given by;

$$C = C_{l \cdot m \cdot n} + \left( \frac{R - R_l}{R_{l+1} - R_l} \times (C_{l+1 \cdot m \cdot n} - C_{l \cdot m \cdot n}) \right) +$$

$$\left( \frac{G - G_m}{G_{m+1} - G_m} \times (C_{l \cdot m+1 \cdot n} - C_{l \cdot m \cdot n}) \right) +$$

$$\left( \frac{B - B_n}{B_{n+1} - B_n} \times (C_{l \cdot m \cdot n+1} - C_{l \cdot m \cdot n}) \right) =$$

$$C_{l \cdot m \cdot n} + \Delta R_l \cdot \Delta C_{l+1 \cdot m \cdot n} + \Delta G_m \cdot \Delta C_{l \cdot m+1 \cdot n} + \Delta B_n \cdot \Delta C_{l \cdot m \cdot n+1}$$

$$M = M_{l \cdot m \cdot n} + \left( \frac{G - G'_m}{G_{m+1} - G_m} \times (M_{l \cdot m+1 \cdot n} - M_{l \cdot m \cdot n}) \right) +$$

$$\left( \frac{B - B_n}{B_{n+1} - B_n} \times (M_{l \cdot m \cdot n+1} - M_{l \cdot m \cdot n}) \right) +$$

$$\left( \frac{R - R_l}{R_{l+1} - R_l} \times (M_{l+1 \cdot m \cdot n} - M_{l \cdot m \cdot n}) \right) =$$

$$M_{l \cdot m \cdot n} + \Delta G_m \cdot \Delta M_{l \cdot m+1 \cdot n} + \Delta B_n \cdot \Delta M_{l \cdot m \cdot n+1} + \Delta R_l \cdot \Delta M_{l+1 \cdot m \cdot n}$$

-continued $$Y = Y_{l \cdot m \cdot n} + \left( \frac{B - B_n}{B_{n+1} - B_n} \times (Y_{l \cdot m \cdot n+1} - Y_{l \cdot m \cdot n}) \right) +$$

$$\left( \frac{R - R_l}{R_{l+1} - R_l} \times (Y_{l+1 \cdot m \cdot n} - Y_{l \cdot m \cdot n}) \right) +$$

$$\left( \frac{G - G_m}{G_{m+1} - G_m} \times (Y_{l \cdot m+1 \cdot n} - Y_{l \cdot m \cdot n}) \right) =$$

$$Y_{l \cdot m \cdot n} + \Delta B_n \cdot \Delta Y_{l \cdot m \cdot n+1} + \Delta R_l \cdot \Delta Y_{l+1 \cdot m \cdot n} + \Delta G_m \cdot \Delta Y_{l \cdot m+1 \cdot n}$$

Thus, it will be understood that the intermediate output values obtained which correspond to the intermediate input values may be made use of as interpolating signals to make color separation negatives sufficiently smooth even if each density step is relatively rough. In this case, however, as mentioned before, what are read out by R, G and B separation signals from the memory are not only already-corrected C, M and Y signals but also such interpolating signals. It is therefore impossible to obtain a satisfactory result in a reduction of the memory's capacity by this method.

As has been stated in the preamble of the instant specification, in order to eliminate the above-described problem, there is proposed an alternative method whose principle is based on the concept of "equivalent neutral density" or "END". A big advantage of this method is that all that should be memorized in a memory are only END correction signals whose absolute values are much smaller and therefore not so many bits are required to represent them. In this respect, this method can be said to be more advantageous in a further reduction of the memory's capacity at least than the forementioned color correction techniques.

Figure 3:
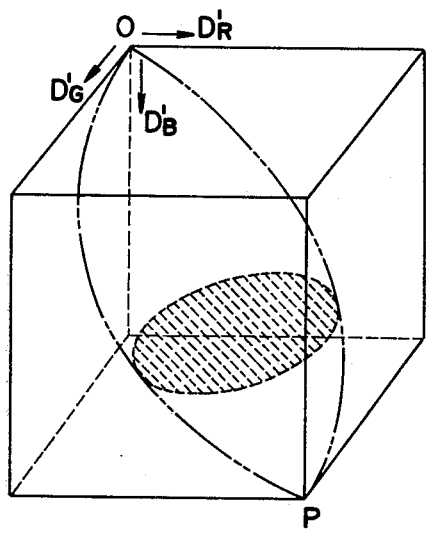
FIG. 3 is a schematic illustration showing the relationship between a preestimated color separation density which a finished print should have and its END correction amount.
Figure 4:
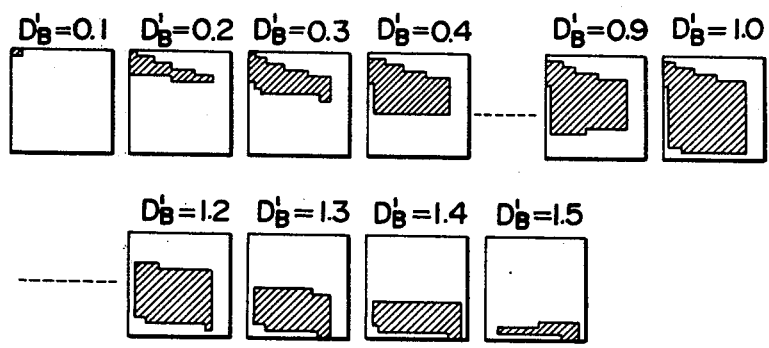
FIG. 4 is a sectional illustration showing how much portion of the memorized contents in a memory is actually used for producing a color reproduction by the printing inks, FIGS. 5 to 7, each comprising A, B and C, are graphical illustrations representing sectional views of color reproduction regions of the six primary colors (R, G, B, C, M, Y), on which END correction amounts have been plotted, FIGS. 8-A and 8-B both are tables partly showing the relationship between a preestimated color separation density ($D_R'$, $D_G'$ and $D_B'$) and its END correction amount, FIGS. 9-A and 9-B both are tables partly showing the relationship between a preestimated color separation density ($D_R''$, $D_G''$ and $D_B''$) whose co-ordinate system has been converted by a premasking circuit according to the invention and its END correction amount.

However, since this method employs a cubic co-ordinate system for the memory as shown in FIGS. 1 and 2, it is impossible to use the memory to its full capacity. In other words, because the color region actually reproducible by the printing inks is substantially narrowed due to the ink contamination, in the memory there remains a considerable portion which is never used for producing a color reproduction. This will be more apparent from FIG. 3 which three-dimensionally shows the relationship between a preestimated density signal and its END correction amount. This FIG. 3 indicates how much the digitalized color separation signals should be corrected in order to obtain recording signals capable of producing a color separation image which has certain preestimated density values ($D_R'$, $D_G'$ and $D_B'$). Shadowed portions in FIG. 4 also indicate areas which are actually used for color reproduction by the inks when $D_B'$ has a certain value ranging from 0.1 to 1.6. From both FIGS. 3 and 4, it will be understood that the color region reproducible by the inks is somewhat barrel-shaped (shown by two-dotted lines in FIG. 3) having a grey axis extending O to P, and that other regions than the barrel-shaped region, in spite of being memorized in the memory, are not in actual use for color reproduction. As referred to before, this problem results from the fact that the forementioned prior techniques employ a cubic co-ordinate system for storing information in the memory.

The present invention is therefore intended to convert the cubic co-ordinate system of the memory to the above-described barrel-shaped co-ordinate system in order to improve an efficiency of usage of the memory, or to reduce a redundancy of the memory.

According to the present invention, as one example, the conversion of the cubic co-ordinate system is performed as follows;

$$D_R'' = D_R'$$
$$D_G'' = D_G' - 0.25 D_R'$$
$$D_B'' = D_B' - 0.5 D_G' \quad (1)$$

In obtaining the coefficients 0.25 and 0.5 in the above equations (1), there are used two alternative ways; one is by solving simple masking equations so that their approximate values are obtained as coefficients of unwanted color components contained in magenta and yellow inks. Another way for finding their approximate values is achieved by plotting END correction amounts according to each color separation density on graphs representing sectional views of color reproduction regions which six fundamental colors (C, M, Y, R, G, B) have.

Figures 8A, 8B:
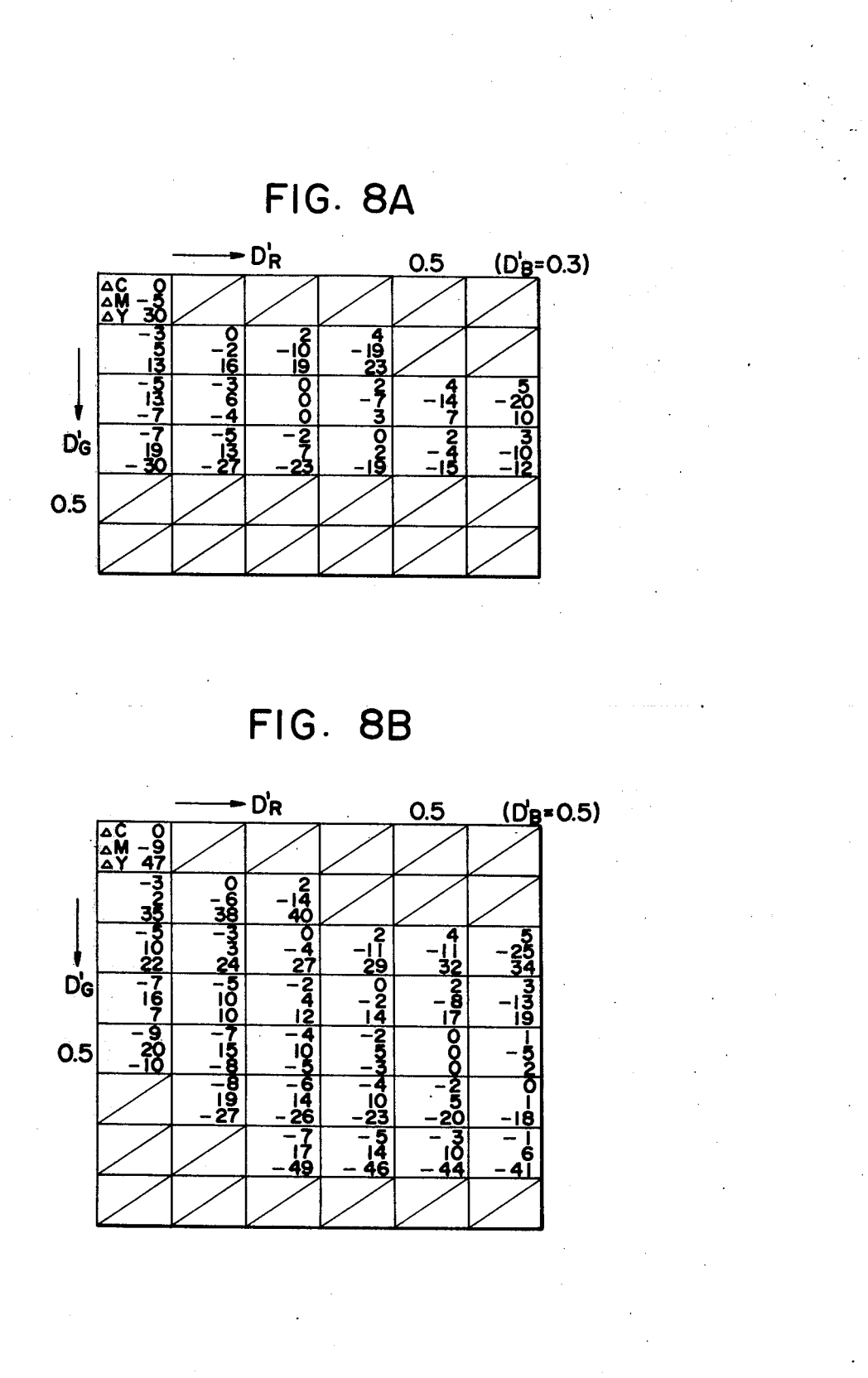

FIG. 8, comprising two tables 8-A and 8-B, indicates how much digitalized color separation density signals should be corrected in terms of the END values. For example, if the preestimated density values $D_R'$, $D_G'$ and $D_B'$ which a finished print is supposed to have are $D_R' = 0.1$, $D_G' = 0.3$ and $D_B' = 0.3$, each of END correction amounts will be $\Delta C = -0.05$, $\Delta M = 0.13$ and $\Delta Y = -0.07$. This implies that, in order that color separation densities of a finished print produced by superimposing proper amounts of C, M and Y inks have 0.1, 0.3 and 0.3 respectively, cyan, magenta and yellow plates must be printed with such ink amounts as corresponding to their respective END values $0.05\{= 0.1 + (-0.05)\}$, $0.43(=0.3 + 0.13)$ and $0.23\{ = 0.3 + (-0.07)\}$.

Figure 6A:
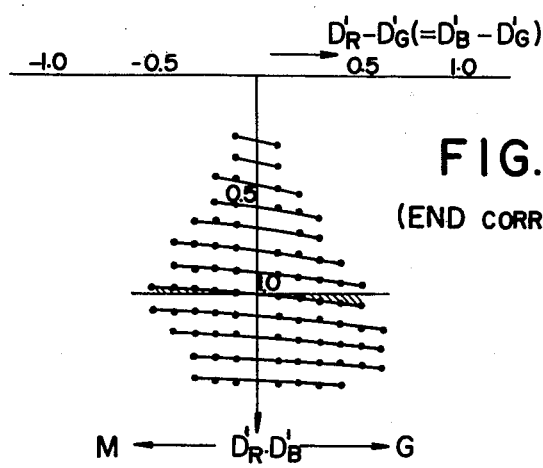
Figure 6B:
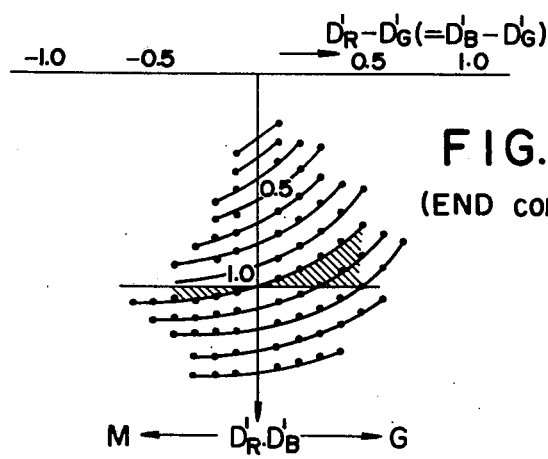
Figure 6C:
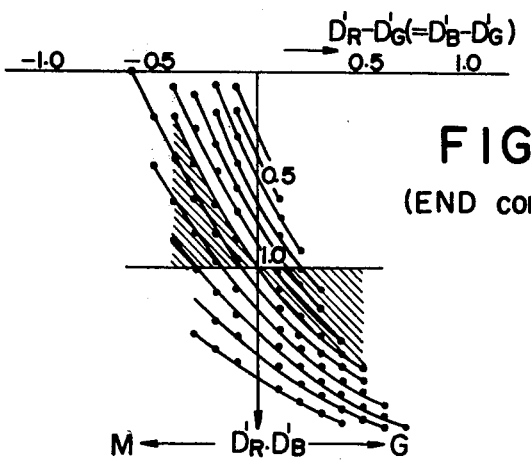
Figure 7A:
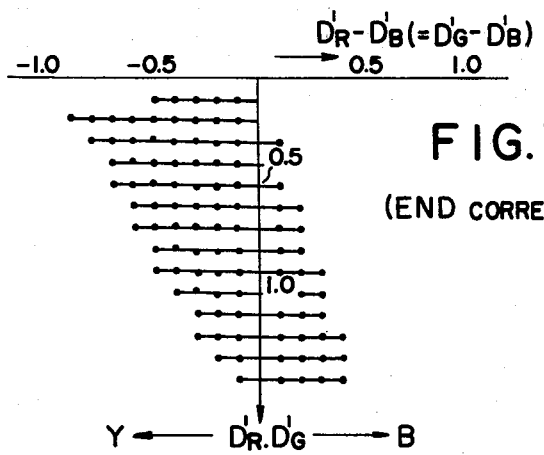
Figure 7B:
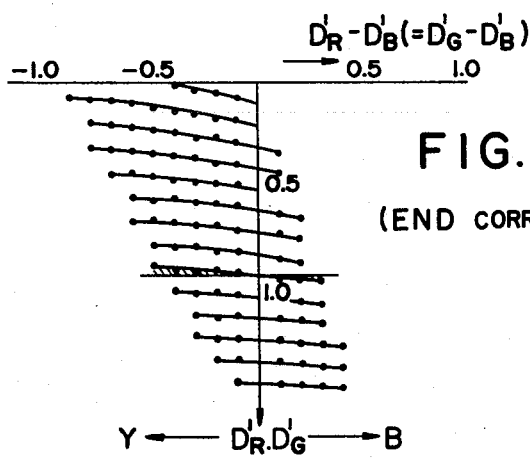
Figure 7C:
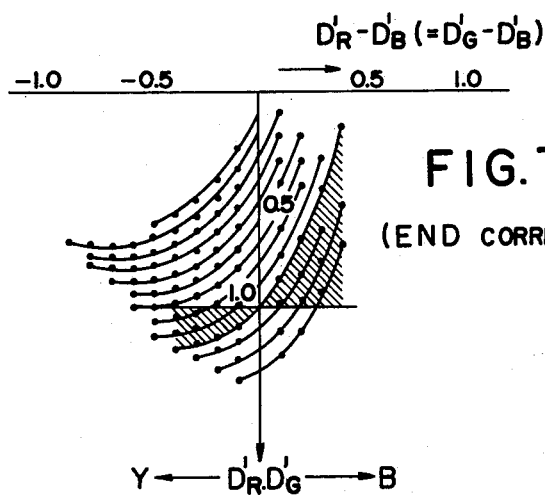

FIGS. 5 to 7, each comprising A, B and C, are graphical illustrations on which END correction amounts have been plotted and which represent sectional views of color reproduction regions six primary colors should have. For example, plotting of FIG. 5-A is carried out as follows;

In the case of $D_R' = 0.1$ and $D_G' = D_B' = 0.3$, its END correction amount $\Delta C$ will be $-0.05$. Therefore, a point having co-ordinates $0.2(=D_G' - D_R' = 0.3 - 0.1)$ and $0.25\{=D_G' (=D_B') + C = 0.3 - 0.05\}$ can be plotted thereon. Other points can also be plotted in a similar manner so that a plurality of slightly inclined lines are formed by joining those points.

As is well known to those concerned with this technical field, these FIGS. 5 to 7 are generally used for seeking how much correction should be added to each amount of C, M and Y inks in order to reproduce a desired color. In each of FIGS. 5 to 7, right and left regions of an axis of ordinates, namely, grey axis, are indicative of hue; similarly, brightness and chroma are expressed by a vertical direction of the grey axis and a distance from the axis respectively. It is apparent from them that, as is the case of FIG. 7-A, the more horizontal a group of those curves become the less color correction is required. Thus, it will be appreciated that coefficients 0.25 and 0.5 used in the foregoing equations (1) are fully imaginable from the END correction tables (FIG. 8) and plots of the END correction amounts (FIGS. 5 to 7).

Figures 9A, 9B:
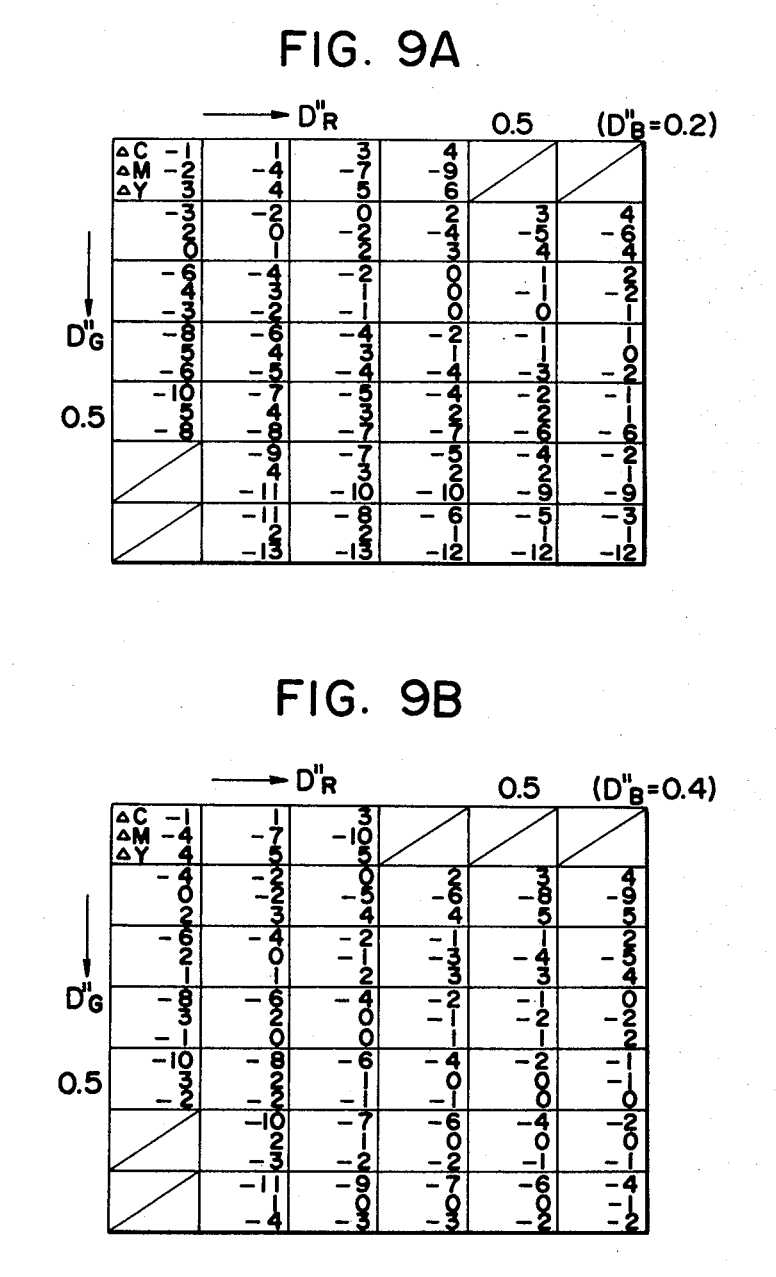

In other words, the conversion of a co-ordinate system by utilizing the equations (1) is to give certain gradients to horizontal axes shown in FIGS. 5 to 7; whereby it becomes possible to make small the values of END correction amounts whose absolute values are relatively larger than others, as shown in FIGS. 9-A and 9-B.

According to the present invention, there is provided before the memory a premasking circuit capable of converting the co-ordinate system. By using this, a usage efficiency of the memory will be greatly improved and a further reduction of the memory's capacity will be achieved.

Figure 10:
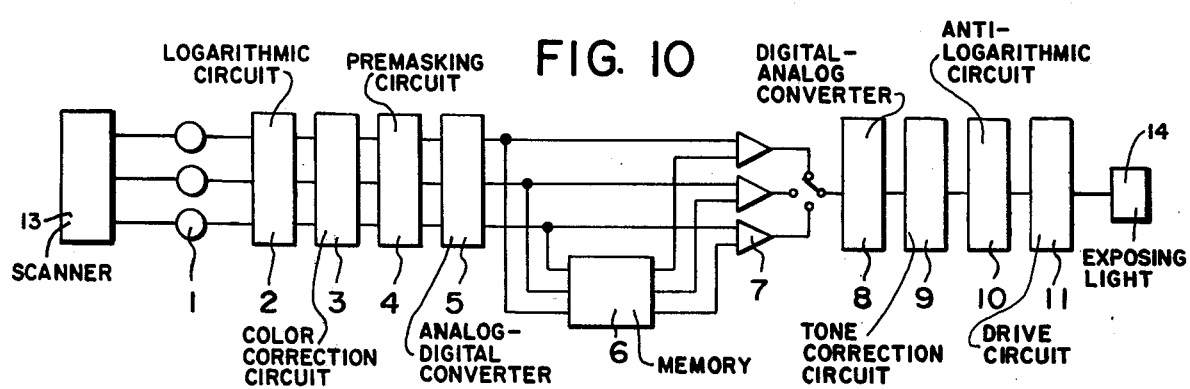
FIG. 10 is a block diagram of a color scanner to which the method of color correction of the invention is applied.

FIG. 10 is a block diagram showing one preferred example of a color scanner to which the color correction method of the invention has been applied.

Light beams which have been divided into R, G and B colors by the scanner 13 are first photoelectrically converted by each photocell 1 to electric color separation signals, which are further converted to color separation density signals $D_R$, $D_G$ and $D_B$ by logarithmic circuit 2. These density signals are then fed into a color correction circuit 3 including compression circuits, where they are multiplied by a variable constant $K(<1)$ and are compressed to the color region reproducible by the printing inks. Thus, they are output therefrom as color separation density signals $D_R'$, $D_G'$ and $D_B'$.

Thereafter, these signals $D_R'$, $D_G'$ and $D_B'$ are fed into a premasking circuit 4. In this instant, it is important to note that each value of these signals is equal to a preestimated color separation density value in the forementioned equations (1) because a finished print is supposed to be like the scanned color original.

Figure 11:
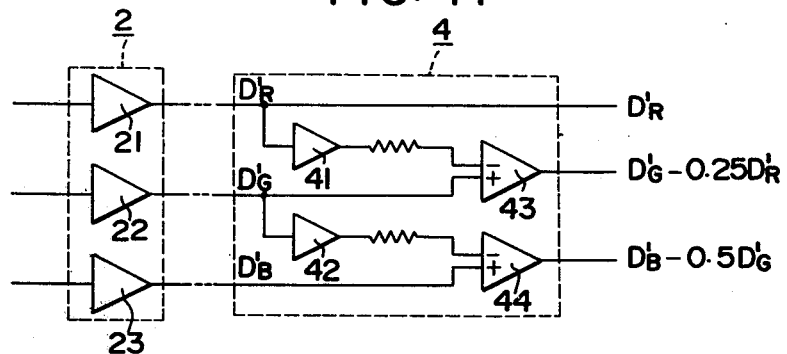
FIG. 11 is a block diagram showing one example of the premasking circuit, FIG. 12, similar to FIG. 4, is a sectional illustration showing how much portion of the contents memorized in a memory will actually be used for color reproduction in accordance with the method of the invention.

One example of the premasking circuit 4 of this kind, although not particularly new to those skilled in the art, is illustrated in FIG. 11. In the conversion of the color separation density signals $D_G'$, $D_G'$ and $D_B'$ to $D_R''$, $D_R''$ and $D_B''$, two density signals $D_R'$ and $D_B'$ out of the three signals $D_R'$, $D_G'$ and $D_B'$ which have been logarithmically converted by log-converters 21 to 23 are amplified by amplifiers 41 and 42 having ¼ and ½ gains respectively. These amplified signals are input to differential amplifiers 43 and 44 through their negative input terminals; whereby a co-ordinate conversion based on the equations (1) is completed.

Color separation density signals $D_R''$, $D_G''$ and $D_B''$ which have gone through the above premasking stage are digitalized by an analog-digital converter 5 and function as addressing signals for reading out the respective END correction signals memorized in a memory 6. The read-out correction signals are then added to or subtracted from the signals $D_R''$, $D_G''$ and by a calculator, thereby obtaining recording signals.

Figure 12:
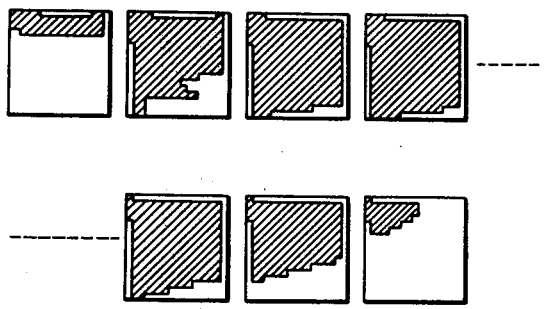

FIG. 12 illustrates how much usage efficiency of the memory 6 has been improved by providing such a premasking circuit 4 before the memory 6. If the memory 6 is of the same capacity as would be when no such a premasking circuit is used, it will be possible to make each interpolated section much smaller so that a jumping amount of the correction signals in a boundary between two adjacent sections will be considerably reduced.

Figure 13:
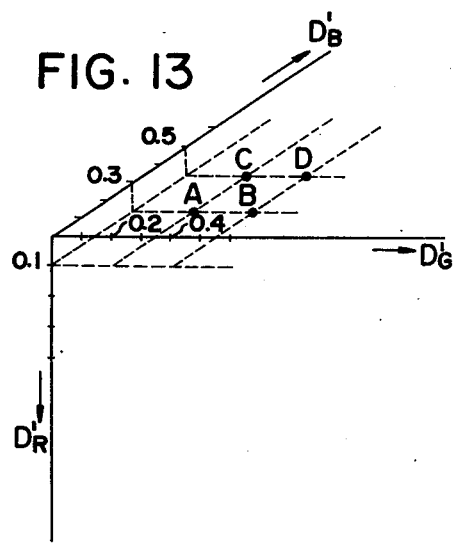
FIG. 13 is a partial three-dimensional illustration of the relationship between a preestimated color separation density and its END correction amount.

For example, assuming that, as is shown in FIG. 13, there are four points A to D whose co-ordinates are;

$A(D_R'=0.1, D_G'=0.2, D_B'=0.3)$, $B(D_R'=0.1, D_G'=0.4, D_B'=0.3)$ $C(D_R'=0.1, D_G'=0.2, D_B'=0.5)$, $D(D_R'=0.1, D_G'=0.4, D_B'=0.5)$, the END correction amount $\Delta Y$ for each point will be 0.13, $-0.30$, 0.35 and 0.07 respectively, as is apparent from FIGS. 8-A and 8-B. In this case, the differences of ΔY between A and B and between C and D will be 0.43 and 0.28 and a jumping amount of the correction signals will be 0.15(=0.43−0.28).

On the other hand, if the above four points A to D are converted in accordance with the equations (1) into A' to D' which substantially correspond to A to D and which have the substantially same area as that of A to D, new co-ordinates of each of the converted points A' to D' will be;

$$A'(D_R''=0.1, D_G''=0.2, D_B''=0.2), B'(D_R''=0.1, D_G''=0.4, D_B''=0.2),$$

$$C'(D_R''=0.1, D_G''=0.2, D_B''=0.4), D'(D_R''=0.1, D_G''=0.4, D_B''=0.4).$$

In this case, the END correction amount ΔY of each point (A' to D') is 0, −0.06, 0.02 and −0.01 as is apparent from FIGS. 9-A and 9-B, and the difference of ΔY between A' and B' or between C' and D' is 0.06 and 0.03 respectively, in which case a jumping amount of correction signals is 0.03. Thus, it will be appreciated that the jumping amount has been decreased to as much as one-fifth of the case where a premasking circuit of this kind is not used.

The resulting recording signals are then converted at a digital-analog converter 8 to analog signals, after which they pass through a tone-correction circuit 9 prior to being converted to already-corrected color separation signals at an anti-logarithmic circuit 10. These signals are adapted to drive a drive circuit 11 which controls exposing light beams 14; thereby producing color separation negatives as desired.

From the descriptions thus far made, it will be understood that in reading out correction signals from a memory by using digitalized color separation density signals as addressing signals the provision of such a premasking circuit capable of converting a co-ordinate system of the memory does not only effect a great improvement in a usage efficiency of the memory but also achieves a further reduction of the memory's capacity by making smaller than absolute values of correction signals to be memorized.

It will be further understood that the provision of the premasking circuit makes possible to decrese a jumping amount of correction signals by making each interpolated section much smaller. Thus, more smooth and accurate color reproduction can be obtained.

Although the contents to be memorized in a memory 6 are preferably END correction signals, it should be noted that a premasking circuit of the kind described above may equally be applicable to the other cases where memorized in the memory are signals representing halftone dot areas or color separation densities.

What we claim is:

1. A method of color correction for a color scanner, a color facsimile or similar device comprising:
    scanning of a color original by spot-by-spot to obtain color separation signals;
    changing the color separation signals to color separation density signals in a logarithmic circuit;
    transforming co-ordinate systems of the color separation density signals into a different co-ordinate system;
    converting the color separation density signals from the different co-ordinate system into digital color separation density signals by an analog-digital converter;
    memorizing the digital color separation density signals with addresses in a memory;
    calculating the recording signals by addition or subtraction of the correction signals, read out of the memory, to or from the digital color separation density signals;
    converting the recording signals into analog signals by a digital-analog converter;
    changing the analog signals to color separation signals in an antilogarithmic circuit; and
    driving a drive circuit controlling exposing light beams by the use of the color separation signals from the antilogarithmic circuit, wherein said correction signals memorized in said memory are END (equivalent neutral density) correction signals whose co-ordinate systems have been converted according to the conversion of the said color separation signals each of said END correction signals corresponding to the difference between a preestimated color separation density value which a finished print is supposed to have and its END value, wherein the conversion of the color separation signals and the conversion of the co-ordinate systems of END correction signals are carried out in accordance with the following equations;

$$D_R'' = D_R'$$

$$D_G'' = D_G' - 0.25 D_R'$$

$$D_B'' = D_B' - 0.5 D_G'$$

wherein $D_R'$, $D_G'$ and $D_B'$ represent said digital color separation density signals whose values correspond to the values of said preestimated color separation densities, and $D_R''$, $D_G''$ and $D_B''$ represent converted density values.

* * * * *